US012775319B2

(12) United States Patent
Tang et al.

(10) Patent No.: US 12,775,319 B2
(45) Date of Patent: Oct. 27, 2026

(54) POWER MANAGEMENT FOR MULTIPLE CIRCUIT DOMAINS

(71) Applicant: NXP B.V., Eindhoven (NL)

(72) Inventors: Jiajian Tang, Shanghai (CN); Ken Yeung, Cupertino, CA (US); Jing Zhao, Shanghai (CN); Yuesheng Liu, Shanghai (CN)

(73) Assignee: NXP B.V., Eindhoven (NL)

( * ) Notice: Subject to any disclaimer, the term of this patent is extended or adjusted under 35 U.S.C. 154(b) by 159 days.

(21) Appl. No.: 18/593,059

(22) Filed: Mar. 1, 2024

(65) Prior Publication Data

US 2024/0329707 A1 Oct. 3, 2024

(30) Foreign Application Priority Data

Mar. 30, 2023 (CN) ......................... 202310333186.1

(51) Int. Cl.
*G06F 1/26* (2006.01)

(52) U.S. Cl.
CPC ..................................... *G06F 1/26* (2013.01)

(58) Field of Classification Search
None
See application file for complete search history.

(56) References Cited

U.S. PATENT DOCUMENTS

| | | | | |
|---|---|---|---|---|
| 8,443,216 | B2 | 5/2013 | De Cesare et al. | |
| 11,106,620 | B1 * | 8/2021 | Mishra | G06F 1/10 |
| 11,262,834 | B1 * | 3/2022 | Brown | G06F 1/28 |
| 2010/0325469 | A1 * | 12/2010 | Yokoyama | G06F 1/3275 713/600 |
| 2011/0022859 | A1 * | 1/2011 | More | G06F 1/3203 713/300 |
| 2011/0276812 | A1 * | 11/2011 | Lee | G06F 1/3203 713/300 |
| 2015/0033047 | A1 * | 1/2015 | Byun | G09G 5/36 713/320 |
| 2017/0006003 | A1 * | 1/2017 | Zakaria | H04L 63/0442 |
| 2017/0150454 | A1 * | 5/2017 | Zhang | H04W 52/386 |
| 2020/0264691 | A1 | 8/2020 | Kurian et al. | |
| 2021/0271276 | A1 * | 9/2021 | Seok | G06F 1/3203 |

* cited by examiner

*Primary Examiner* — Danny Chan

(57) ABSTRACT

Aspects of the disclosure are directed to apparatuses and methods involving a plurality of circuit domains and power management circuitry. Each domain includes logic circuitry to perform one or more tasks in response to command inputs and to operate under power conditions that are different than power conditions under which another one of the domains operates. The power management circuitry outputs respective commands for operating the circuit domains, including controlling the sequence of respective operations carried out by each of the plurality of circuit domains by issuing each of the commands in a sequence corresponding to both a programmed counter value assigned to each command and a counter circuit output value.

18 Claims, 5 Drawing Sheets

POWER MANAGEMENT FOR MULTIPLE CIRCUIT DOMAINS

CROSS-REFERENCE TO RELATED APPLICATIONS

This application claims priority under 35 U.S.C. § 119 to China Patent Application No. 202310333186.1, filed on Mar. 30, 2023, the contents of which are incorporated by reference herein.

OVERVIEW

Aspects of various embodiments are directed to power management with multiple circuit domains.

Electronic circuitry such as that involving semiconductor chips may benefit from a variety of approaches to power control. For instance, multiple power domains may be used for a particular chip design in an effort to conserve power, for instance by using different power modes. For instance, power on and off, voltage level, clock gate, frequency, firewall, reset, and other functions may be controlled (e.g., by a hardware finite state machine) in a manner that conserves energy.

While useful, such approaches can be susceptible to challenges. For instance, once a chip tape out has been carried out, it may not be possible to change designs. Carrying out a new tape out or other product development/launch approach can be expensive and may result in delays in getting a product to market. These and other matters have presented challenges to efficiencies of circuit implementations with power control, for a variety of applications.

SUMMARY

Various example embodiments are directed to issues such as those addressed above and/or others that may become apparent from the following disclosure concerning the operation of multiple circuit domains with different power characteristics. In certain example embodiments, aspects of the present disclosure involve issuing commands based on a timestamp or counter-type value associated with each command, which may be programmed to control issuance of each command relative to a counter or clock-type circuit.

In a more specific example embodiment, an apparatus includes a plurality of circuit domains and power management circuitry. Each domain includes logic circuitry to perform one or more tasks in response to command inputs and to operate under power conditions that are different than power conditions under which another one of the domains operates. The power management circuitry is configured to output respective commands for operating the circuit domains. This may include controlling the sequence of respective operations carried out by each of the plurality of circuit domains, by issuing each of the commands in a sequence corresponding to both a programmed counter value assigned to each command and a counter circuit output value.

In other specific example embodiments, a method involves controlling a sequence of respective operations carried out by each of a plurality of circuit domains, each domain including logic circuitry to perform tasks in response to command inputs, by issuing commands in a sequence corresponding to both a programmed counter value assigned to each command and a counter circuit output value. One or more tasks are carried out in each of the plurality of circuit domains in response to the issued commands, including operating under power conditions that are different from power conditions under which another one of the domains operates.

The above discussion/summary is not intended to describe each embodiment or every implementation of the present disclosure. The figures and detailed description also exemplify various embodiments.

BRIEF DESCRIPTION OF FIGURES

Various example embodiments may be more completely understood in consideration of the following detailed description in connection with the accompanying drawings, in which.

Figure 1:
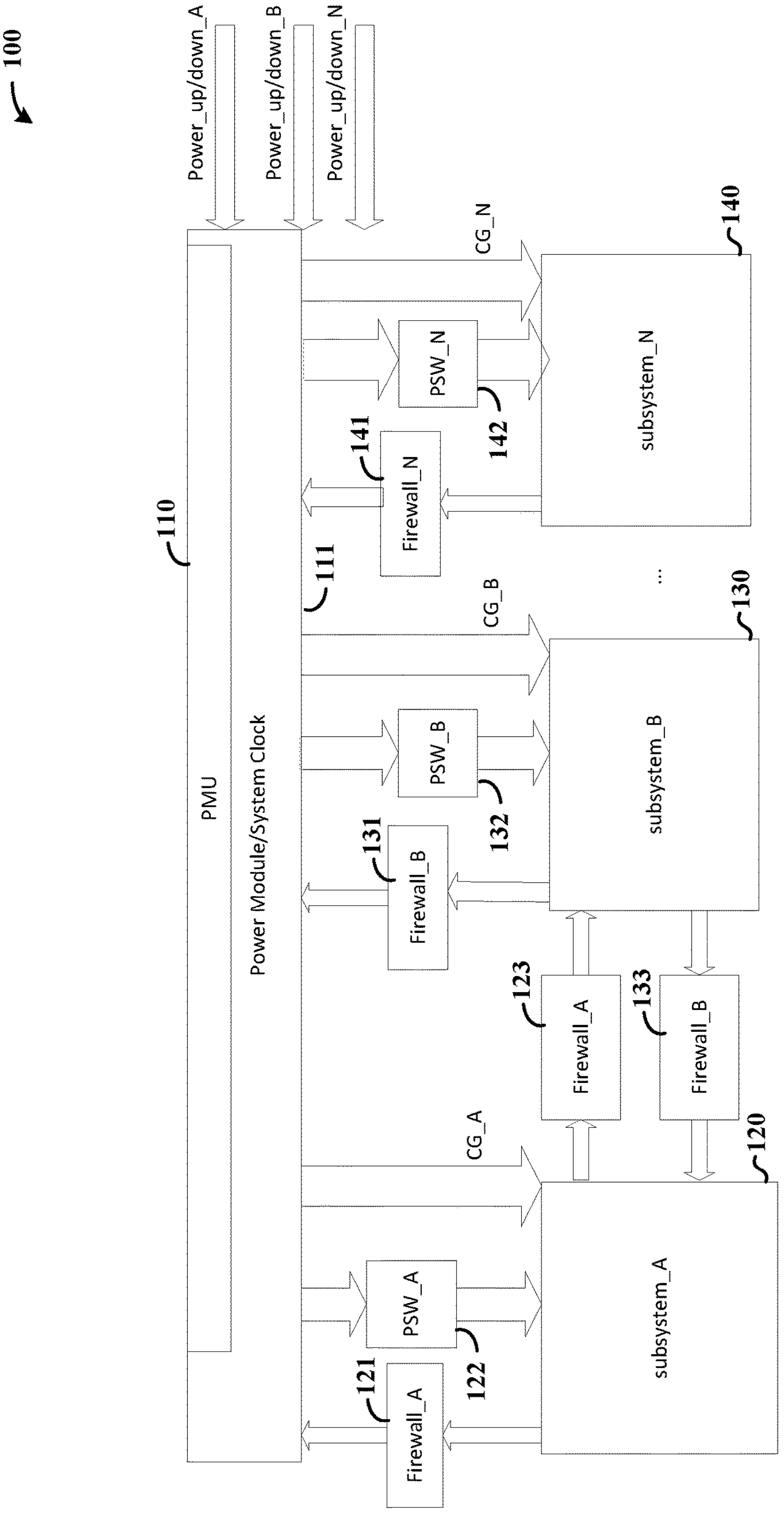
FIG. 1 is a system-level diagram illustrating an example power management operation, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving power domains that operate under different power conditions. Certain embodiments may be utilized in systems involving circuitry that operates under different power levels and/or at different times. Aspects of the present disclosure may be beneficial when used in the context of dynamically controlling the operation of power domains with a counter or timestamp-based command sequence. Specific implementations utilize reprogrammable power domain commands that are issued based on counter or timestamp values assigned to the commands and which may be reprogrammed by assigning different counter or timestamp values. Such commands may relate to sequences of operations that carry out power domain functions. While not necessarily so limited, various aspects may be appreciated through the following discussion of non-limiting examples, which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well-known features may have not been described in detail so as not to obscure the description of the examples herein. For case of illustration, the same reference numerals may be used in different diagrams to refer to the same elements or additional instances of the same element. In addition, although aspects and features may in some cases be described in individual figures, it will be appreciated that features from one figure or embodiment can be combined with features of another figure or embodiment even though the combination is not explicitly shown or explicitly described as a combination.

Particular embodiments are directed to schemes utilized to control individual circuit domain operations, such as power on/off, clock run/stop, and firewall enable/disable operations, in a system using a programmable counter or timestamp-based value. With this scheme, each control signal may operate in real-time, with the sequence and any delay between each control signal being programmable and reprogrammable. At various stages, for instance after production is complete, the control signals may be updated and toned to reach desired operation and performance.

In accordance with another embodiment, an apparatus includes a plurality of circuit domains, and power management circuitry operable to control the domains. Each domain includes logic circuitry that may perform tasks in response to command inputs, and which are further operable under power conditions that are different from power conditions under which another one of the domains operates. For instance, circuit domains in this context may involve different sets of circuitry on a common chip, in which respective ones of the sets may operate at different voltage levels. The power management circuitry may thus output respective commands for operating the circuit domains, such as for controlling a sequence of operations carried out by each of the circuit domains. Each of the commands may, for example, be issued in a sequence corresponding to (e.g., defined by) both a programmed counter value (e.g., as may be referred to as a timestamp) assigned to each command and an actual value output by a counter. In certain embodiments, the apparatus includes a counter circuit that outputs the counter value.

In certain instances, the apparatus may further be responsive to control input signals that may affect operation of the respective circuit domains. Such an approach may, for example, involve toggling (issuing) a command when a counter as above reaches a predefined value, when a control input signal for that command is received, or when both the control input has been received and the counter has reached the predefined value.

The power management circuitry may operate in a variety of manners to suit particular applications. In some embodiments, the power management circuitry is configured to alter the sequence of the respective operations in response to the programmed counter values being reprogrammed to a different value. As such, the order in which the respective commands are issued may be changed by reprogramming the counter value assigned to particular commands. In certain embodiments in which each of the commands has a different programmed counter value, the power management circuitry may issue commands in a sequence corresponding to the counter values of each command, beginning with a lowest counter value and continuing in sequence with respectively higher counter values, in reverse order, or in another predefined order. The power management circuitry may control a variety of operations, such as to power each circuit domain off and on separately from the other domains. Further, the power management circuitry may power each circuit domain under a power condition that is different from a power condition at which another one of the domains is operated. Further, the power management circuitry may output respective commands in a sequence that causes the respective circuit domains to carry out power on and power off functions, which may include independently powering each of the circuit domains on and off.

In specific implementations, the power management circuitry may store counter value data correlating each of the respective commands to a specific counter value. For each of the respective commands, the stored counter value data is replaced with a new counter value in response to a reprogramming input specifying the new counter value and the command. For instance, a programming input can be provided to the power management circuitry, which causes the replacement of the counter value.

In certain embodiments, the power management circuitry issues one or more commands in response to both the counter circuit output value corresponding to the programmed counter value assigned to the one or more commands, and an enable control signal that enables issuance of the command being received. For instance, the command may be enabled in response to the enable control signal, and issued when the counter circuit output value reaches the programmed counter value.

The apparatus may further include clock circuit that outputs a clock signal on which the circuit domains operate. The power management circuitry may output respective commands for the clock circuit in response to a programmed counter value for the clock circuit command corresponding to the current counter value. The frequency of the clock signal may be variably controlled by outputting respective clock circuit commands specifying different frequencies, based on different counter values programmed for each of the respective clock signals and a counter value the counter circuit output value.

The apparatus-based functions characterized herein may be implemented in accordance with one or more method-based embodiments. In a particular embodiment, a sequence of respective operations carried out by each of a plurality of circuit domains is controlled, in which each domain includes logic circuitry to perform tasks in response to command inputs. Commands are issued in a sequence corresponding to both a programmed counter value assigned to each command, and a counter circuit output value. Counter value data correlating each of the respective commands to a specific counter value may be stored and replaced with a new counter value when a reprogramming input specifying the new counter value and the command is received.

In each of the plurality of circuit domains, one or more tasks are performed in response to the issued commands, including operating under power conditions that are different from power conditions under which another one of the domains operates. For instance, each circuit domain may be operated under a power condition that is different from a power condition at which another one of the domains is operated.

A counter circuit may be operated to output the counter value. In addition, a clock circuit may be used to output a clock signal on which the circuit domains operate, with commands for the clock circuit being output in response to a programmed counter value for the clock circuit command corresponding to the counter value.

The sequence of the respective operations may be altered by reprogramming the programmed counter values to a different value, therein changing the order in which the respective commands are issued. For instances in which each of the commands has a different programmed counter value, the commands may be issued in a sequence corresponding to the counter values of each command. For example, the sequence may begin with a lowest counter value and continuing in sequence with respectively higher counter values, or in another order.

In some instances, one or more of the commands are conditionally issued. For instance, a command may be issued in response to both the counter circuit output value corresponding to the programmed counter value assigned to the command, and receiving an enable control signal input that enables issuance of the command. In some instances where the enable signal is received first, the command may be issued when the counter value equals that of the programmed command. In instances where the counter value is reached first, the command may be issued once the enable control input is received.

Turning now to the figures, FIG. 1 shows a system 100, as may be implemented in accordance with one or more embodiments. The system 100 includes power management circuitry 110 as well as subsystems 120 (subsystem_A) and 130 (subsystem_B), and may further include multiple other subsystems such as subsystem 140 (subsystem_N). Each subsystem may operate as a power domain, for example as may be implemented within a device having circuitry operating at a high voltage level in one power domain, and having other circuitry operating at a low voltage level in a different power domain.

Each power domain may include, for example, logic circuitry on a common chip having multiple such power domains, such as to facilitate low power operation. In these and other contexts, the subsystems 120, 130 and 140 (where implemented) may include logic circuitry that performs one or more tasks in response to command inputs, and which also operates under power conditions that are different than power conditions under which another one of the domains operates. The power management circuitry 110 may thus output respective commands for operating the subsystems 120, 130 (and 140), for controlling the sequence of respective operations carried out by each of the circuit domains, by issuing each of the commands in a sequence corresponding to both a programmed counter value assigned to each command and a counter circuit output value. For instance, to save power in the system 100, subsystem A and B can be independently powered on and off.

Various other circuitry (including that as shown in FIG. 1) may be implemented to effect operations as characterized herein. For instance, one or more counter circuits may be implemented with the power management circuitry 110, power/system clock circuitry 111, or with individual subsystems 120, 130 and 140. Counter values may thus be provided in a variety of manners, to suit particular applications. Further, a power switch 122 (PSW_A) may be used to enable or disable power of subsystem 120, and power switch 123 (PSW_B) may be used to enable or disable power of subsystem 130. Firewall circuitry 121 (Firewall_A) may be implemented to clamp output signal values from subsystem 120 when it is powered off. Similarly, firewall circuitry 131 (Firewall_B) may be used to clamp output signal values from subsystem 130 when it is powered off. Firewalls 123 and 133 may respectively be utilized to isolate subsystems 120 and 130.

Control inputs may be provided to the power switches at the direction of power management circuitry 110, for example using power/system clock circuitry 111 (e.g., which may be implemented as a single circuit and/or combined circuitry with power management circuitry 110). Such control signals may be implemented, for example, in accordance with power up/down inputs to the power management circuitry 110 that may specify a timestamp or counter value at which the respective power up/down sequences are to be operated. Similarly, clock signals CG_A, CG_B and CG_N may be used facilitate enabling/disabling of a clock provided to (or operating within) the respective subsystems 120, 130 and 140. For instance, when both subsystems 120 and 130 are off, the PMU can reduce output voltage of power module, and may reduce the output frequency of a system clock at 111.

In some implementations, the power management circuitry 110 operates to issue commands based on a counter value and programmed value associated with the commands as follows. When a power down event is to be initiated, subsystem 120 may be reset to a stable state, and firewalls 121, 123 maybe clamped to fixed values. Power may be cut off to subsystem 120 via power switch 122. For powering subsystem 120 up, power switch 122 may be opened and subsystem 122 may be released into a stable state, after which the firewalls 121, 123 are released. Subsystem 130 may be similarly powered up and down. If both subsystems power down, the power management circuitry may reduce the output voltage and gate the system clock.

Figure 2:
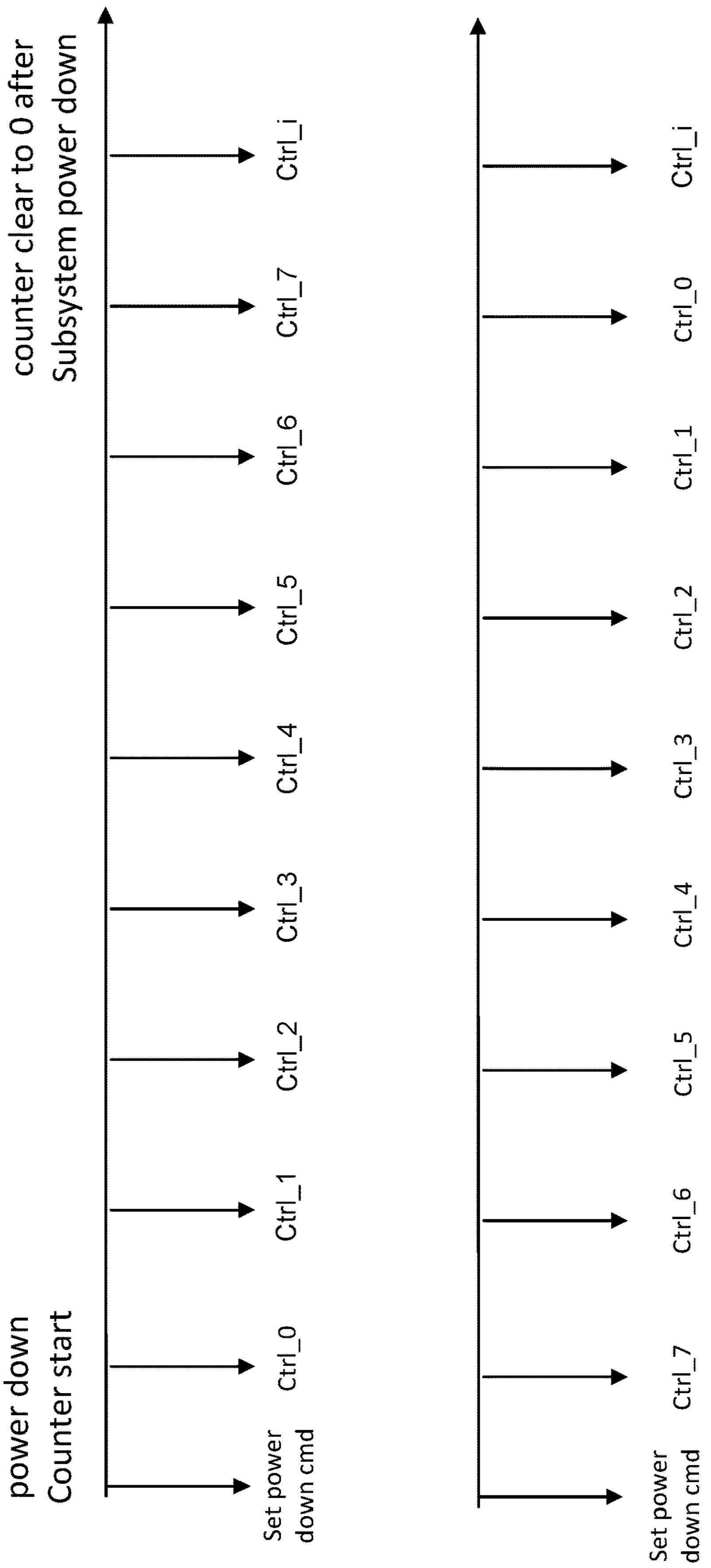
FIG. 2 shows a timestamp based power-down sequence, as may be implemented in accordance with the present disclosure.
Figure 3:
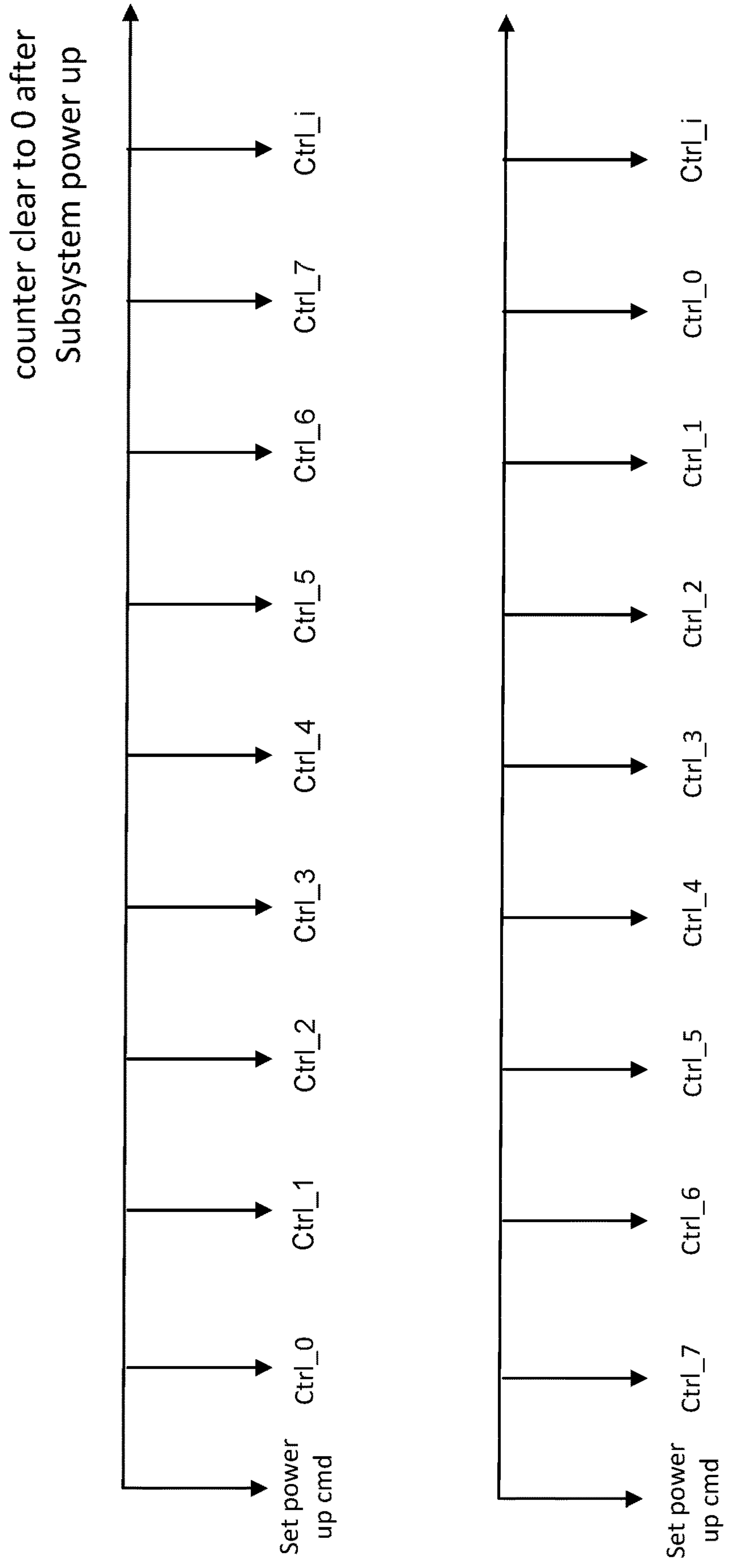
FIG. 3 shows a timestamp based power-up sequence, as may be implemented in accordance with the present disclosure.

FIGS. 2 and 3 respectively show timestamp based power-down and power-up sequences, as may be implemented in accordance with one or more embodiments. Respective control inputs 0-7 and "i" may be output as shown, for instance in referring to FIG. 2, beginning with a power down counter start and clearance of the counter once the system has powered down.

In some embodiments, each system maintains a free running counter that starts in response to a power up command and clears to zero when the power up sequence completes. The counter may also start in response to a power down command and clear to zero when the power down sequence completes. Under such conditions, power up and power down commands may be issued such that they are not simultaneously applied to a particularly subsystem. Accordingly, referring to FIG. 2, the default value of ctrl_0, ctrl_1, and ctrl_2 may be programmed to be one or zero. Each control signal is given a predefined counter value, for example if ctrl_0=30, ctrl_1=40, and ctrl_2=50, ctrl_0 toggles when the counter reaches 30, ctrl_1 toggles when the counter reaches 40, and ctrl_2 toggles when the counter reaches 50. As another example, if ctrl_0=50, ctrl_1=40 and ctrl_2=30, ctrl_2 toggles when the counter reaches 30, ctrl_1 toggles when the counter reaches 40, and ctrl_0 toggles when the counter reaches 50.

In some implementations, a flexible input hw_ctrl is used to pair with each control input. For instance, a control signal hw_ctrl_0 may pair with ctrl_0, and control signal hw_ctrl_1 may pair with ctrl_1. These flexible inputs may be enabled or may be left disabled, providing a flexible AND with/OR with ctrl_0. In such an embodiment, when ctrl_0 reaches a certain predefined counter value, the ctrl_0 may be implemented in accordance with three options:

Option1, ctrl_0 toggles immediately,

Option2, ctrl_0 toggles when the control signal hw_ctrl_0 is asserted, and Option3, ctrl_0 toggles when both hw_ctrl_0 is asserted and a counter reaches predefined value.

Power down steps as shown in FIG. 2 may be carried out as follows. Each toggle signal timepoint is configured (e.g., ctrl_i_timepoint). If configured to zero, the related signal cannot toggle. A power down command is set and a counter is started. Each signal can toggle at a predefined timepoint together with its pair of control input (hw_ctrl) where applicable. The last signal toggle indicates the end of a sequence, and the counter is cleared to zero. Each control input can be programmed such that it is delivered in any order specified by a programmed counter/timestamp value.

Power up sequences such as shown in FIG. 3 may be similarly carried out. Each toggle signal timepoint (e.g., ctrl_i_timepoint) can be configured with a counter value (and again, if configured to zero, the related signal cannot toggle). A power up command is set and the counter is started. Each signal can toggle at predefined timepoint and, where applicable, together with its control signal pair of hw_ctrl. The last signal toggle indicates the end of the sequence and the counter is cleared to zero.

Figure 4:
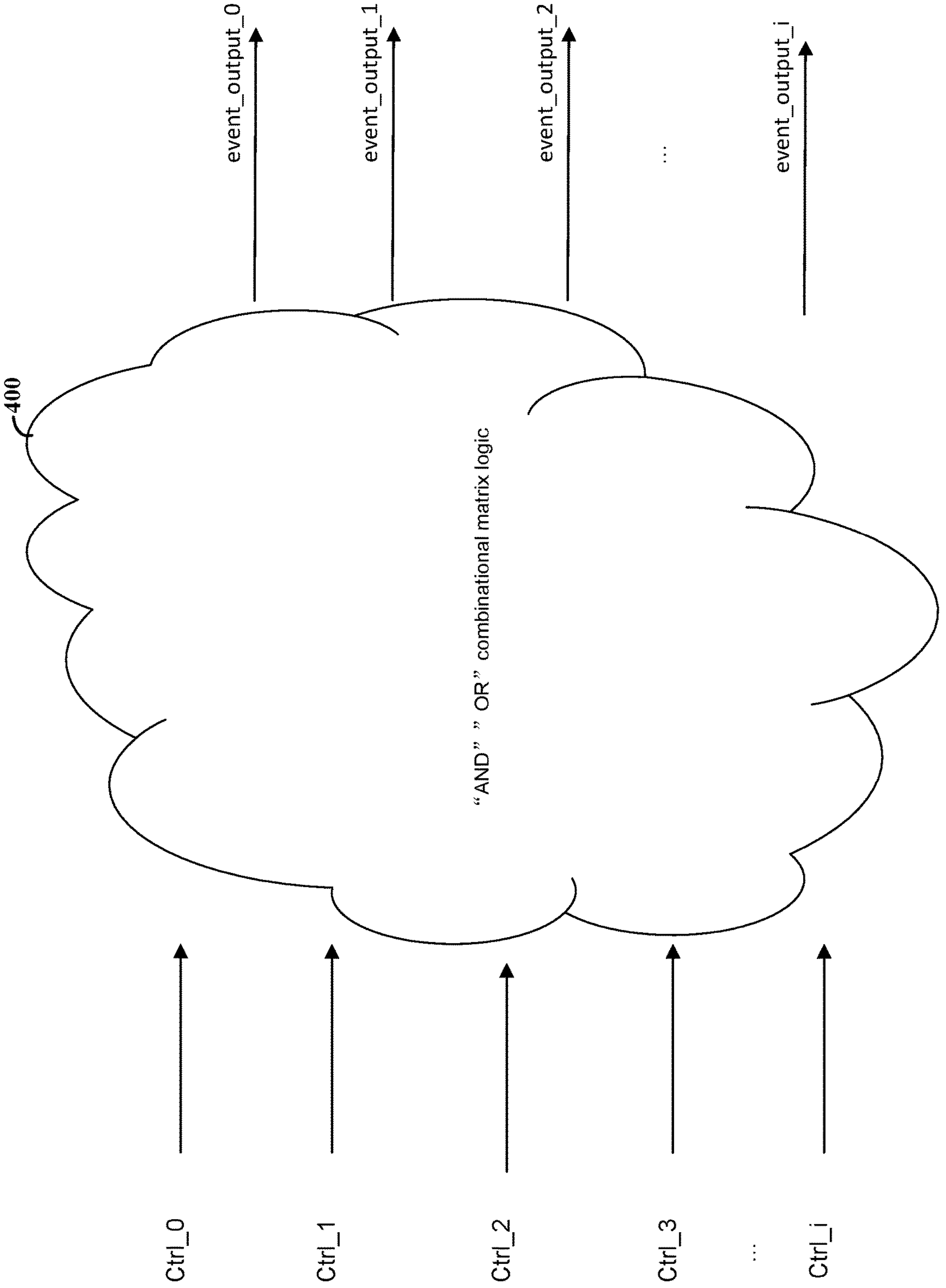
FIG. 4 shows an event output matrix based on a control input signal ctrl_i, as may be implemented in accordance with the present disclosure.

FIG. 4 shows an event output matrix with combinatorial logic 400 that operates based on a control input signal ctrl_i, as may be implemented accordingly, for instance to effect and/or type operation. The event output can select one, two, or three control inputs. For instance, the following options may be implemented for certain embodiments:

Option1, event output=ctrl_0,
Option2, event output=ctrl_1,
Option3, event output=ctrl_0 AND ctrl_1, and
Option4, event output=ctrl_0 OR ctrl_1

The event outputs may include, for example, clock frequency, clock gate, voltage level, power gate, and/or firewall enable outputs.

The content of a scheduler may be implemented as follows:

Event output map to internal ctrl,
1 map event output 0 to ctrl_A0,
2 map event output 1 to ctrl_A1,
3 map event output 2 to ctrl_A2,
4 map event output 3 to ctrl_B0,
5 map event output 4 to ctrl_B1,
6 map event output 5 to ctrl_B2,
7 map event output 6 to ctrl_A0&ctrl_B0, and
8 map event output 7 to ctrl_A2&ctrl_B2.

Referring to FIG. 1, this approach may be implemented to configure system A and system B with time stamp values as follows:

1 config ctrl_A0 timestamp value to 2,
2 config ctrl_A1 timestamp value to 4,
3 config ctrl_A2 timestamp value to 6,
4 config ctrl_B0 timestamp value to 2,
5 config ctrl_B1 timestamp value to 4, and
6 config ctrl_B2 timestamp value to 6.

A user may use an event output as follows:

1 map event output 0 to CG_A,
2 map event output 1 to firewall_A,
3 map event output 2 to PSW_A,
4 map event output 3 to CG_B,
5 map event output 4 to firewall_B,
6 map event output 5 to PSW_B,
7 map event output 6 to CLOCK_GATE, and
8 map event output 7 to POWER_GATE.

Figure 5:
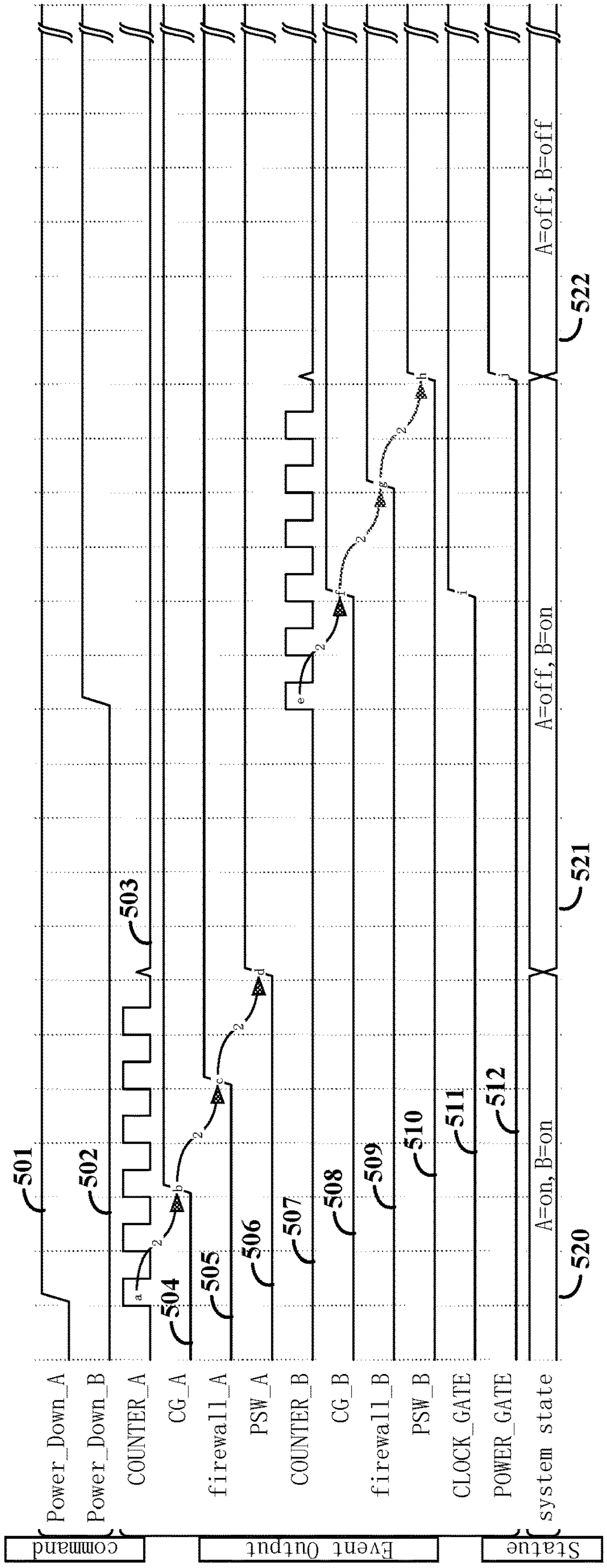
FIG. 5 shows a power control sequence, as may be implemented in accordance with the present disclosure.

FIG. 5 shows a power control sequence, as may be implemented in accordance with one or more embodiments, for example, with the above configuration. By way of example, power domain A may be implemented with subsystem 120 of FIG. 1, and power domain B may be implemented with subsystem 130 of FIG. 1. Respective signals are shown for powering down respective power domains A and B, with three conditions resulting in which power domain A and B are on at 520, power domain A is off with power domain B on at 521, and both power domains off at 523.

When a power down command for domain A is issued at 501, counter A (503) begins and operations for a control gate (504), firewall (505), and power off (506) sequence are carried out. When a power down command for domain B is issued at 502, counter B (507) begins and operations for a control gate (508), firewall (509) and power off (510) sequence are carried out. System clock gate 511 and power gate 512 follow as shown, which may reduce power consumption when both domains are off.

As examples, the specification describes and/or illustrates aspects useful for implementing the claimed disclosure by way of various circuits or circuitry which may be illustrated as or using terms such as blocks, modules, device, system, unit, controller, domain and/or other circuit-type depictions (e.g., reference numerals 120, 130 and 140 of FIG. 1 may depict a block/module as described herein). Such circuits or circuitry may be used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing operations such as power up or power down as characterized herein. Yet another process or method in this context would be recognized in connection with the functions/activities associated with the steps characterized in connection with any one of FIGS. 2-5.

For example, in certain of the above-discussed embodiments, one or more modules are discrete logic circuits or programmable logic circuits configured and arranged for implementing these operations/activities, as may be carried out in the approaches shown in FIGS. 2-4. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described with certain circuit operations is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a first domain and a second domain, where the domain might be replaced with terms such as "circuit," "circuitry" and others, the adjectives "first" and "second" are not used to connote any description of the structure or to provide any substantive meaning; rather, such adjectives are merely used for English-language antecedence to differentiate one such similarly-named structure from another similarly-named structure.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. As another example, the order and number of operations may be modified to suit particular embodiments, for instance with the steps depicted in FIGS. 2 and 3 being reduced or increased, or similar steps may be effected to carry out functions other than power up or power down functions. Such modifications do not depart from the true spirit and scope of various aspects of the disclosure, including aspects set forth in the claims.

What is claimed is:

1. An apparatus comprising:
a plurality of circuit domains,
wherein each domain includes logic circuitry
to perform one or more tasks in response to command inputs, and
to operate under power conditions that are different than power conditions under which another domain in the plurality of domains operates; and
power management circuitry configured to output the command inputs for operating the plurality of circuit domains, including
controlling a sequence of operations carried out by each domain of the plurality of circuit domains, by
issuing each of the command inputs in a sequence corresponding to both a counter value assigned to each of the command inputs and a counter circuit output value; and
wherein the power management circuitry is configured to alter the sequence of each domain's operations in response to the counter values being reprogrammed to different counter values, therein changing an order in which the command inputs for each domain are issued.

2. The apparatus of claim 1,
further including a counter circuit configured to output the counter circuit output value.

3. The apparatus of claim 1,
wherein each of the command inputs has a different counter value, and
wherein the power management circuitry is configured to issue the command inputs in a sequence corresponding to the counter value of each of the command inputs beginning with a lowest counter value and continuing in sequence with higher counter value.

4. The apparatus of claim 1,
wherein the power management circuitry is configured and arranged with the circuit domains to power each circuit domain off and on separately from the other domains.

5. The apparatus of claim 1,
wherein the power management circuitry is configured and arranged with the circuit domains to power each circuit domain under a power condition that is different than a power condition at which another one of the domains is operated.

6. The apparatus of claim 1,
wherein the power management circuitry is configured to store counter value data correlating each of the command inputs to a specific counter value, and for each of the command inputs to replace the stored counter value data with a new counter value in response to a reprogramming input specifying the new counter value and the command inputs.

7. The apparatus of claim 1,
further including a clock circuit configured to output a clock signal on which the circuit domains operate,
wherein the power management circuitry is configured to output commands for the clock circuit having corresponding counter values for the clock circuit commands.

8. The apparatus of claim 7,
wherein the power management circuitry is configured and arranged with the clock circuit to variably control a frequency of the clock signal by outputting clock circuit commands to each domain specifying different frequencies based on different counter values programmed for each domain's clock signals.

9. The apparatus of claim 1,
wherein the power management circuitry is configured to output the command inputs by outputting commands to independently power each of the circuit domains on and off by issuing commands in a sequence that causes each of the circuit domains to carry out power on and power off functions.

10. The apparatus of claim 1,
wherein the power management circuitry is configured to issue each of the command inputs by issue the command inputs in response to the counter circuit output value corresponding to the counter value assigned to each of the command inputs and in response to receiving an enable control signal input that enables issuance of each of the command inputs.

11. The apparatus of claim 10,
wherein the power management circuitry is configured to enable each of the command inputs in response to the enable control signal, and to issue each of the command inputs when the counter circuit output value reaches the counter value.

12. A method comprising:
controlling a sequence of operations carried out by each of a plurality of circuit domains,
wherein each domain includes logic circuitry to perform tasks in response to command inputs, by
issuing the command inputs in a sequence corresponding to both a counter value assigned to each of the command inputs and a counter circuit output value; and
in each of the plurality of circuit domains, performing one or more tasks in response to the command inputs, including operating under power conditions that are different than power conditions under which another one of the domains operates;
wherein controlling further includes altering the sequence of the operations by reprogramming each of the counter values to a different value, therein changing an order in which the command inputs are issued to each domain.

13. The method of claim 12,
further including operating a counter circuit to output the counter circuit output value.

14. The method of claim 12,
wherein each of the command inputs has a different counter value, and
wherein issuing the command inputs includes issuing the command inputs in a sequence corresponding to the counter values of each of the command inputs beginning with a lowest counter value and continuing in sequence with higher counter values.

15. The method of claim 12,
wherein issuing the command inputs includes operating each circuit domain under a power condition that is different than a power condition at which another one of the domains is operated.

16. The method of claim 12,
further including storing counter value data correlating each of the command inputs to a specific counter value, and for each of the command inputs,
replacing the stored counter value data with a new counter value in response to a reprogramming input specifying the new counter value and each of the command inputs.

17. The method of claim 12,
further including using a clock circuit to output a clock signal on which the circuit domains operate, wherein commands for the clock circuit are output based on their corresponding counter value.

18. The method of claim 12, wherein at least one of the command inputs is issued in response to the counter circuit output value corresponding to the counter value assigned to that command input and in response to receiving an enable control signal input that enables issuance of that command input.

* * * * *